April 4, 1950 — D. T. RUPPE — 2,502,889
AUTOMATIC TRAILER BRAKE
Filed Aug. 6, 1947 — 2 Sheets-Sheet 1
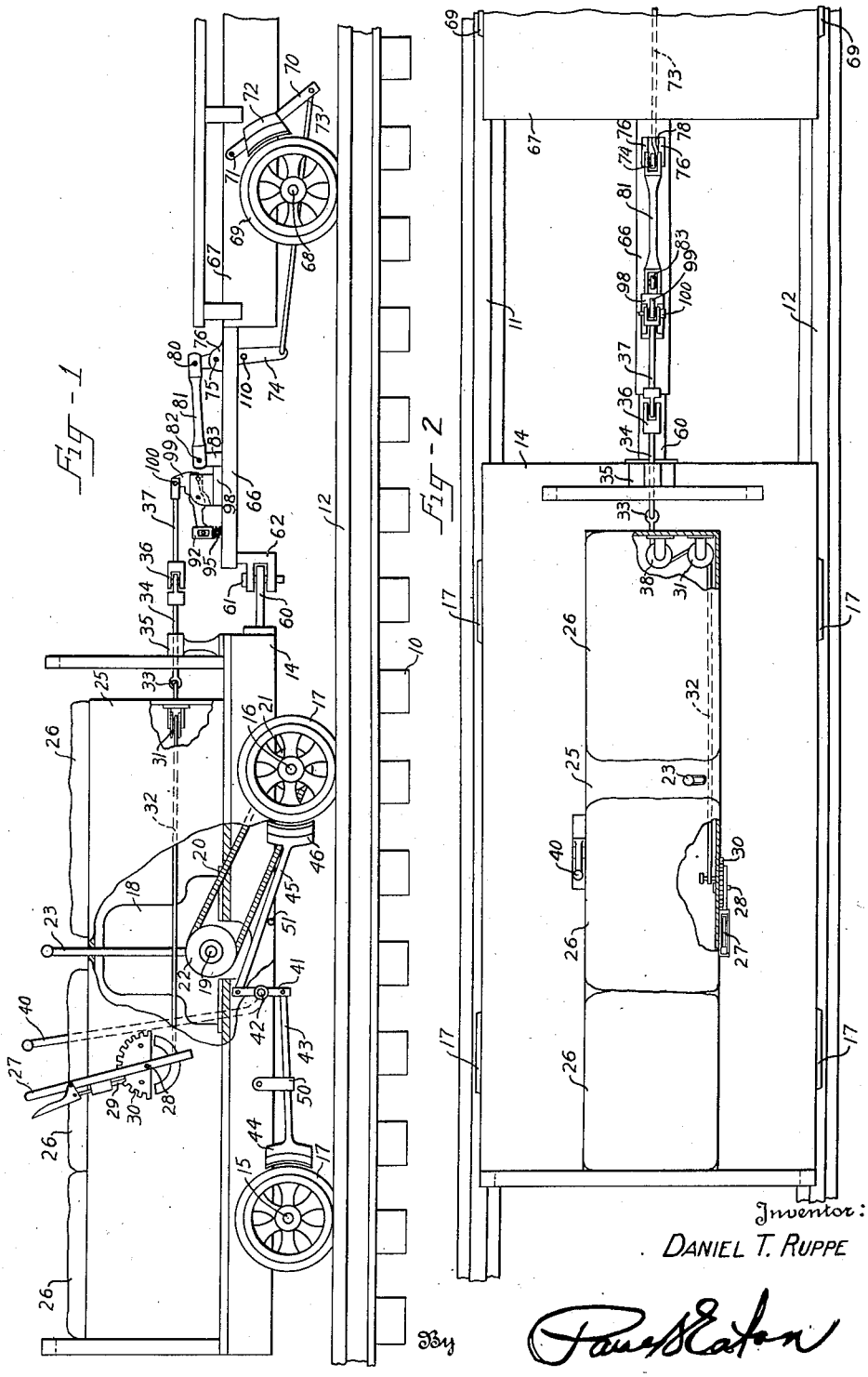
Inventor:
DANIEL T. RUPPE
By Paul S. Eaton
Attorney April 4, 1950   D. T. RUPPE   2,502,889
AUTOMATIC TRAILER BRAKE
Filed Aug. 6, 1947   2 Sheets-Sheet 2
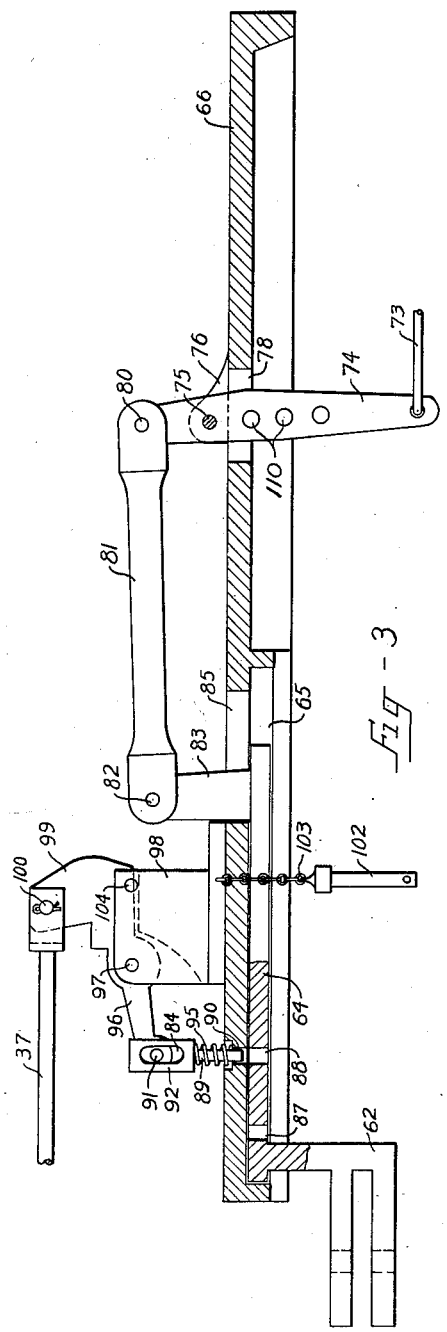
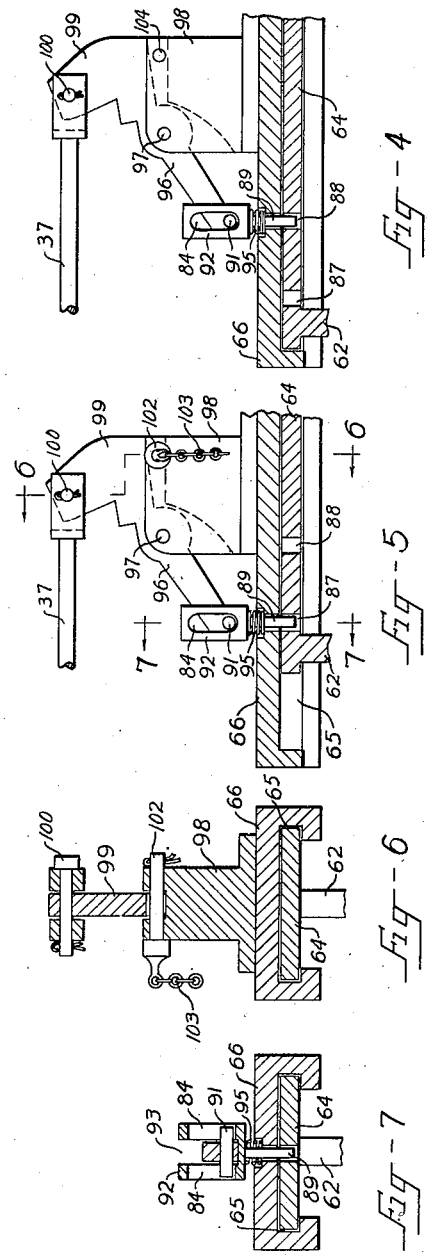
Inventor:
DANIEL T. RUPPE
By
Paul Eaton
Attorney Patented Apr. 4, 1950

2,502,889

UNITED STATES PATENT OFFICE 2,502,889

AUTOMATIC TRAILER BRAKE

Daniel T. Ruppe, Star, N. C.

Application August 6, 1947, Serial No. 766,719

3 Claims. (Cl. 188—125)

This invention relates to a trailer and tractor combination and more especially to a trailer having means for automatically applying the brakes thereto when the brakes of the tractor are applied, thus preventing the trailer from over-riding the tractor or jack-knifing the tractor. It is more especially adapted to railway hand cars which are propelled by motive power and which sometimes have one or more trailers hooked therebehind and is so designed that when the brakes are applied to the hand car or tractor that the brakes will be automatically applied to the trailer by the impetus or inertia stored in the trailer. This invention is especially adaptable for railway rolling stock such as small power operated cars for repair crews and the like for trailers pulled thereby but it can equally be applicable to automotive vehicles and automotive trailers or semi-trailers pulled by suitable tractors.

It is therefore an object of this invention to provide a trailer adapted to be pulled by a tractor and having slidable means for automatically applying the brakes to the trailer when there is a sudden decrease in speed of the tractor. There also are means provided whereby, when it is desired to move the tractor and trailer in a reverse direction, the automatic brake applying means can be locked against operation to thereby permit the tractor and trailer to be backed without application of the brakes to the trailer. Means are also provided whereby when the trailer is released from the tractor, and left standing, the brakes can be latched in applied position to prevent rolling of the trailer while it is detached from the tractor.

Some of the objects of the invention having been stated, other objects will appear as the description proceeds when taken in connection with the accompanying drawings, in which Figure 1 is an elevation of a section of railroad track showing a motor propelled car and a portion of a trailer attached thereto;

Figure 2 is a top plan view of Figure 1 omitting some of the rear portion of the trailer;

Figure 3 is a longitudinal sectional view of the hitch between the tractor and trailer;

Figure 4 is a view similar to the front or left-hand portion of Figure 3 but showing the parts in a different position;

Figure 5 is a view similar to Figure 4 but showing the slidable parts of the trailer hitch latched against movement relative to the drawbar;

Figure 6 is a vertical sectional view taken along the line 6—6 in Figure 5;

Figure 7 is a vertical sectional view taken along the line 7—7 in Figure 5.

Referring more specifically to the drawings, the numeral 10 indicates cross ties of a railway track having rails on trackways 11 and 12 disposed thereon. The earth supporting the cross ties is omitted. On these rails there is mounted for movement a motor propelled hand car comprising a frame work 14, front and rear axles 15 and 16 on the ends of which are mounted flanged wheels 17. This motor propelled hand car has a suitable gasoline motor 18 mounted therein provided with a drive shaft 19 having a pulley 22 thereon on which is mounted a belt 20 which also passes around a suitable pulley 21 disposed on one of the axles such as the rear axle 16. There is a suitable clutch, not shown, between the pulley 22 and the motor 18 and the clutch is mounted on the shaft 19 and this is manipulated by a clutch lever 23.

The motor propelled hand car has disposed along the central portion thereof a suitable raised portion 25 having cushions 26 on top thereof on which the operators and persons sit while riding along the trackway. The hand car also has a suitable brake lever 27 pivoted as at 28 and having a pawl 29 adapted to engage a segmental portion 30 for locking the brake lever 27 in position.

The lever 27 has connected thereto a rearwardly extending cable 32 which passes around and in back of a pulley 31 and then around the front of a pulley 38 and which is connected as at 33 to a link 34 slidably mounted in a bearing 35 and connected by a universal joint 36 to a link 37.

The hand car is also equipped with a brake lever 40 secured to a shaft 42, and on each end of the shaft 42 is fixed a double ended lever 41. One end of each of the double ended levers 41 has a shaft 43 extending therefrom having a brake shoe 44 thereon and the other end of each lever 41 has a rod 45 extending therefrom with a brake shoe 46 on its free end. These rods 43 and 45 are supported for sliding movement by means of a suitable cuff 50 for the rod 43 and a suitable pin 51 for the rod 45. This is conventional structure and appears on both sides of the car, but only one side is shown.

The motorized hand car is equipped with a conventional drawbar 60 on which is releasably fitted by means of a pin 61 a bracket 62 which has an uprising portion which is integral with a sliding bar 64, which sliding bar is slidably mounted in a dove-tailed groove 65 cut in the lower surface of a drawbar 66 which has its rear end connected to a trailer car 67. This trailer car has front and rear axles 68, only the front axle being shown, on which flanged wheels 69 are mounted and suitable brakes are applied to these wheels by means of a bar 70 being pivoted as at 71 on each side of the frame work of the trailer car 67 and having a brake shoe 72 thereon adapted to engage the wheels 69 of the trailer.

To the lower end of the bar 70 is pivotally connected a link 73 which extends forwardly and is pivotally connected to the lower end of a lever 74 pivoted as at 75 between a pair of uprising spaced projections 76 rising from the main drawbar 66. The main drawbar 66 between the uprising portions 76 has a vertically disposed slot 78 through which the lever 74 projects. The upper end of lever 74 has pivotally connected thereto as at 80 a link 81 which is pivoted as at 82 to an uprising projection 83 integral with the sliding bar 64. There is an elongated slot 85 in the main drawbar 66 in which the uprising projection 83 has back and forth movement.

The sliding bar 64 has two vertically disposed holes 87 and 88 therein for the reception of a pin 89 which is mounted for vertical sliding movement in a vertically disposed bore 90 in the main drawbar 66. The pin 89 has integral with the upper end thereof a U-shaped member 92 having a slot 93 vertically disposed therein, and a compression spring 95 normally forces the pin 89 along with the U-shaped member 92 upwardly. The U-shaped member 92 also has a pair of coinciding vertically disposed slots 84 therein and a pin 91 is mounted for vertical sliding movement in these slots 84. The pin 91 is mounted in one end of a lever 96 pivoted as at 97 in a longitudinally extending slot in the upper end of an uprising portion 98 integral with the drawbar 66. Lever 96 has rising upwardly therefrom an arm portion 99 to which is pivotally connected as at 100 the rear end of the rod 37. When it is desired to lock the pin 89 in lowermost position so that it will enter hole 87 to lock the brakes 72 on the trailer, portion 99 of lever 96 is raised upwardly and a pin 102, secured against loss by a chain 103, is inserted through a hole 104 to hold the pin 89 in lowered position to thus lock the brakes on the trailer and prevent its movement when it is disconnected from the tractor.

When it is desired to back the tractor and trailer and thus avoid automatic application of the brakes on the trailer, the top end of lever 27 is pulled rearwardly with the parts in the position shown in Figure 3 and this will cause the pin 89 to enter hole 88 as shown in Figure 4 and lock the sliding bar 64 against movement relative to the drawbar 66, and allow the tractor and trailer to be backed without application of the brakes.

When it is desired to apply the brakes to the trailer before the tractor is disconnected therefrom, the lever 27 will be rotated in a clockwise manner in Figure 1 which will cause the pin 89 to enter hole 88 in the slidable member 64 and then pin 102 will be inserted beneath the rear end of portion 99 of the lever having a front portion 66 operatively engaging the pin 89 and then pin 100 can be removed to disconnect the shaft 37 from the member 99 and at the same time coupling pin 61 will be removed so the tractor can be moved away from the trailer and the trailer brakes will be left in applied position.

It will be noted that the lever 74 has a plurality of spaced holes 110 therein, and the pin 75 can be placed in any one of these holes 110. If the greatest leverage is desired in applying the brakes, then the pin 75 would be disposed in the lowermost hole 110, but the brakes would be applied at a slower rate of speed, but if quick acting brakes were desired with less leverage, then the parts would be in the position shown in Figure 3.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In a tractor and trailer, a drawbar secured to the trailer and extending forwardly towards the tractor, a slidable member mounted in the drawbar and having its front end secured to the tractor, application of brakes on the tractor serving to cause the drawbar and the trailer to travel at a faster rate of speed than the tractor, brakes for the trailer and a connection between the brakes and the slidable member in the drawbar for applying brakes of the trailer when there is relative forward motion of the drawbar relative to the slidable member connected to the tractor, the slidable member having a pair of vertically disposed spaced holes therein, a latch member mounted on the drawbar, means mounted on the tractor and connected to the latch member for moving the latch member downwardly into one of said holes in the slidable member for locking the slidable member against movement relative to the drawbar to hold the brakes of the trailer in off position while the tractor and trailer are moved rearwardly, said latch also being adapted to be moved into the other of the two holes in the slidable member for locking the brakes on the trailer in applied position when it is desired to uncouple the trailer from the tractor and leave the brakes applied on the trailer, and means associated with the drawbar for locking the latch in one of said holes to cause the brakes to remain applied after the tractor is disconnected from the trailer.

2. In a tractor and trailer, a draw bar secured at its rear end to the trailer and extending forwardly towards the tractor, said draw bar having a dove-tailed groove in its lower front surface, a sliding bar mounted in the dove-tailed groove and having a downwardly depending tongue on its front end provided with means for securing the same to the tractor, the draw bar having a longitudinally extending slot in its upper surface and a post rising upwardly from the sliding bar and projecting upwardly through said slot in the upper portion of the draw bar, said draw bar having a second slot extending vertically therethrough and provided with a pair of spaced projections disposed on the upper side of the draw bar and on opposed sides of the last-named slot, a lever pivotally mounted between said projections and extending a substantial distance above and below the draw bar, a link connecting the upper end of said lever to the upwardly projecting portion on the sliding bar, the trailer having brakes and a link securing said brakes to the lower end of said lever, said sliding bar having a pair of spaced holes therein, an L-shaped lever pivotally mounted on the top of the draw bar and having a downwardly depending pin on one end and the other of said L-shaped lever having a link extending forwardly to the tractor and said tractor being provided with means for moving the last-named lever to move said pin into the rearmost of said holes in the sliding bar to lock the brakes of the trailer in off position, and to move said pin into the forward one of said holes in the sliding bar to lock the brakes in applied position.

3. Apparatus of the class described comprising a motor propelled vehicle adapted to be moved along railway tracks, a trailer having a drawbar on the front end thereof with means for connecting the same to the motor propelled vehicle, brakes on the trailer for application to the wheels of the trailer, said drawbar having a member slidably mounted therein releasably connected to the motor propelled vehicle, said slidable member having a projection thereon, said drawbar having a slot extending vertically therethrough, a lever pivotally mounted in said slot and extending a substantial distance above and below the drawbar, means connecting the projection on the slidable member with the upper end of the lever, means connected to the lower end of the lever and to the brakes of the trailer for applying the brakes to the trailer when the speed of the trailer is greater than that of the motor propelled vehicle to cause the drawbar to slide forwardly relative to the slidable member, said trailer drawbar having a single locking means mounted therein and said slidable member having a pair of spaced holes thereon, means for moving the locking means into one of said holes for locking the trailer drawbar against movement relative to the slidable member when it is desired to back the motor propelled vehicle and the trailer, said locking means also being adapted to be moved into the other of said holes in the slidable member for locking the slidable member relative to the trailer drawbar to lock the brakes of the trailer in applied position when it is desired to disconnect the motor propelled vehicle from the trailer drawbar.

DANIEL T. RUPPE.

REFERENCES CITED

The following references are of record in the file of this patent:

UNITED STATES PATENTS

| Number | Name | Date |
| --- | --- | --- |
| 780,666 | Kelso | Jan. 24, 1905 |
| 1,613,086 | Cox | Jan. 4, 1927 |
| 1,717,977 | Houston | June 18, 1929 |
| 2,130,874 | Burgin | Sept. 20, 1938 |
| 2,253,631 | Latta | Aug. 26, 1941 |